united States Patent Office
2,789,439
Patented Apr. 23, 1957

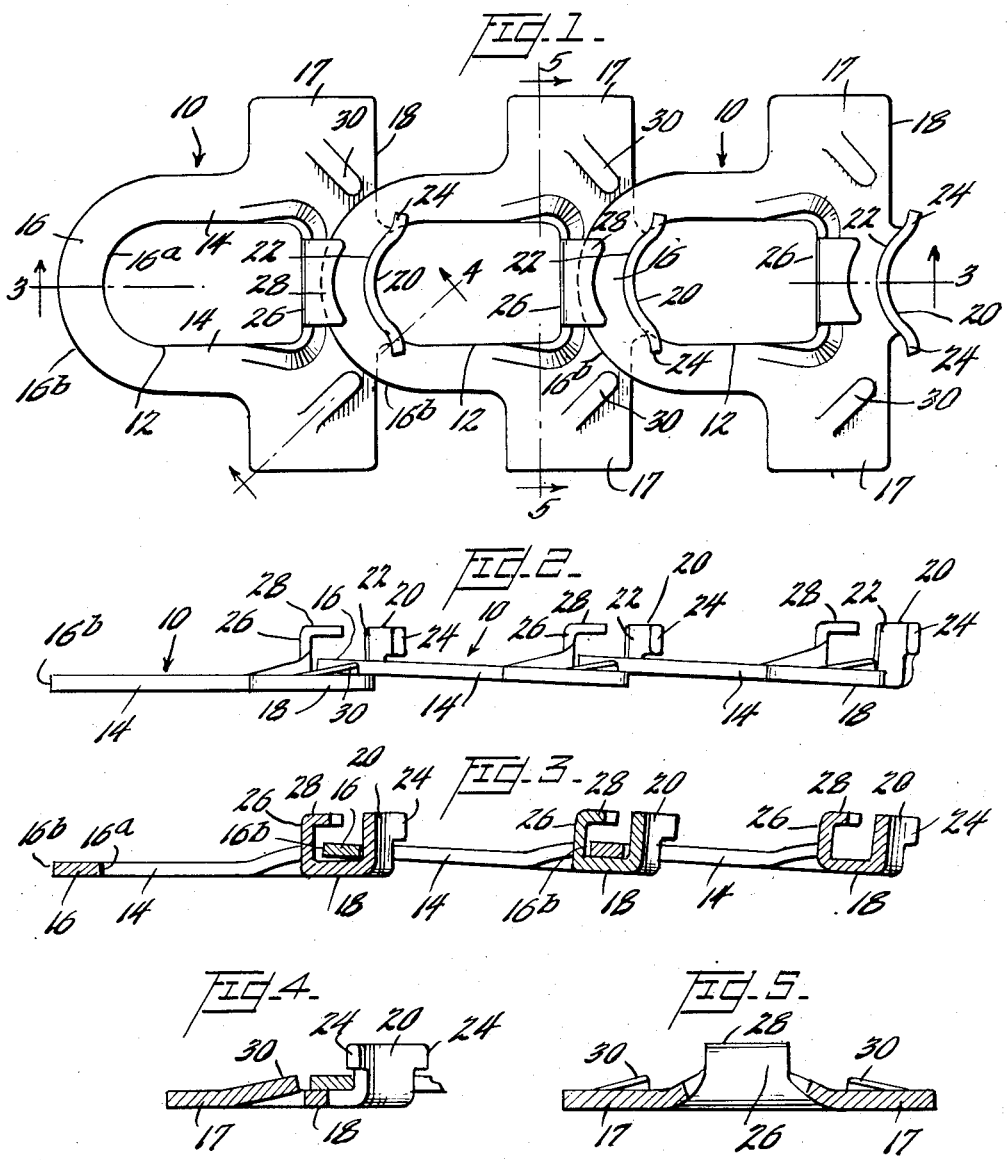

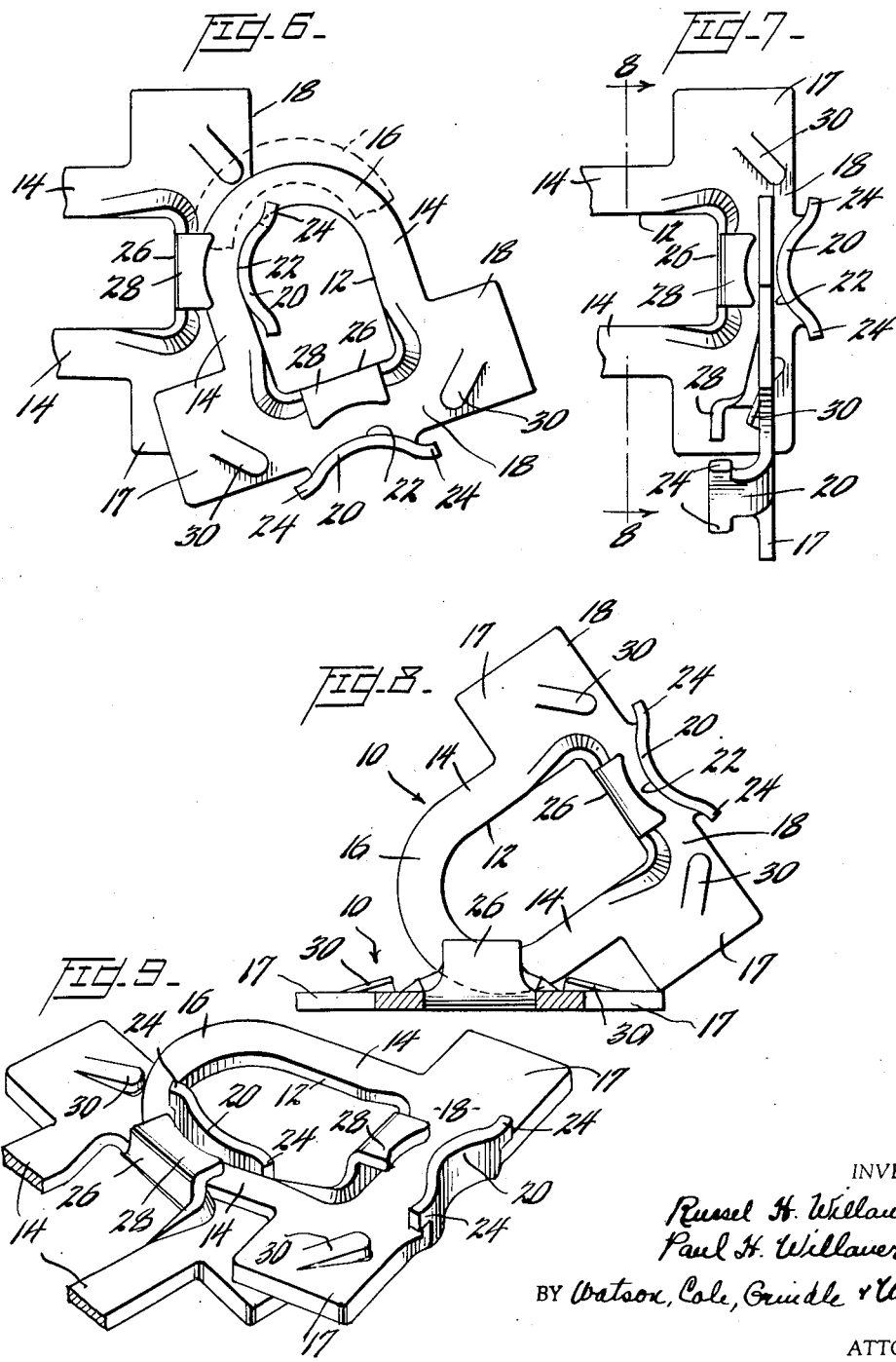

2,789,439

CHAIN AND CHAIN LINK

Russell H. Willauer and Paul H. Willauer,
Quakertown, Pa.

Application May 7, 1956, Serial No. 583,237

7 Claims. (Cl. 74—250)

This invention relates to an improved chain link adapted for use in sprocket chains, and to a laterally flexible chain formed from such links.

It has been customary heretofore to provide laterally flexible sprocket type chains, the individual links of which comprise metal stampings, each having a pintle portion at one end thereof loosely associated with a hook portion of an adjoining link, the hook portion and pintle portion having laterally arcuate bearing surfaces to permit lateral flexing of the chain, and the pintle portion being loosely associated with the hook portion to permit such flexing as well as the vertical flexing required in order for the chain to pass around a sprocket wheel. Due to the looseness of the connection between adjoining links, and the amount of lost motion inherent in such connection, there is a tendency for such chains to become kinked when slack, with possibility of damage or disconnection between the links when the chain is subsequently drawn taut. For this reason it has not been generally practical to arrange the interconnections between the links to permit manual coupling or disconnection of adjoining links, but rather it has been customary after placing the pintle of one link in the hook portion of an adjoining link, to then deform or permanently close the hook around the pintle to prevent inadvertent uncoupling of the links. This has not only rendered the assembling operation unduly complicated and expensive, but has also increased the difficulty of replacing worn links, and of removing or adding links, as when it is desired to alter the length of the chain.

With the foregoing in mind, the primary objects of the present invention are: to form the links in a novel manner whereby they may be economically produced by sheet metal stamping and forming operations, and thereafter coupled together or disconnected merely by suitable manual manipulations, without the use of tools; to interconnect the links in such manner that the resulting chain will be virtually kink-proof; and to so arrange the interconnections between the links, that despite their susceptibility to manual uncoupling, it will be virtually impossible for them to become inadvertently uncoupled through twisting, flexing or kinking of the chain or through other manipulations or conditions incident to their usual handling or operation.

Thus, in accordance with the invention, each of the links comprises a flat body formed with an elongated opening and including transversely spaced sides, and ends interconnecting the respective sides, one of the ends constituting a pintle having an arcuately curved inner edge for bearing engagement with the pivot element of an adjoining link, the pivot element of each link formed at the opposite end thereof from the pintle, projecting normally from the plane of the body, for reception in the opening of an adjacent link and has an arcuate surface in operative bearing engagement with the arcuate edge of the pintle of the adjoining link. A novel feature of the instant invention consists in forming the pivot element of each link with laterally projecting retainer lugs overlying the body of the adjoining link to prevent uncoupling of the said links when same are in relative longitudinally aligned positions.

A further feature consists in providing the pintle of each link with an arcuate outer edge concentric to its inner edge, for bearing engagement with an upstanding backstop element fixed on an adjoining link, whereby the backstop may maintain the pintle and pivot at all times in journaled relation to prevent relative dislocation of these parts, to thereby prolong the life and increase the smoothness of operation of the chain, and to prevent kinking and thus reduce the likelihood of damage to or inadvertent uncoupling of the links.

A further feature consists in providing a limit plate carried by one of said elements of one link in overhanging relation to the pintle of an adjoining link for preventing such relative angular movement between the links in a plane normal to their bodies, as might permit the edge of said pintle to rise above the backstop when the chain is slack, with consequent danger of kinking and/or separation of the links.

A still further feature consists in the provision on each link of upstanding abutments arranged to limit the normal pivotal movement between adjoining links, within a range wherein the body of each link underlies the retainer lugs of the pivot on an adjacent link, as long as the bodies of the two links are in substantially parallel planes, but to permit additional such movement when the two links are tilted or twisted relative to each other. These abutments are spaced from the adjacent extremities of the retainer lugs of their respective link sufficiently to permit withdrawal therebetween the pintle and associated sides of an adjoining link when the latter is properly tilted.

The invention, of course, contemplates the use at times of certain of these features without others, as well as of the entire combination of such features.

The foregoing, as well as other incidental features and advantages, are all incorporated in and attained by the preferred embodiment of the invention, illustrated in the accompanying drawings, in which:

Figure 1 is a plan view of a chain of links in accordance with the invention;

Figure 2 is a side elevation of said chain;

Figure 3 is a section on the line 3—3 of Figure 1;

Figure 4, a section on the line 4—4 of Figure 1;

Figure 5, a section on the line 5—5 of Figure 1;

Figure 6 is a fragmentary plan view of two links in the early stages of disassembly;

Figure 7 is a fragmentary plan view of said links in the final stage of disassembly;

Figure 8 is a section on the line 8—8 of Figure 7; and

Figure 9 is a perspective view of the links in the position of Figure 6.

Referring now in detail to the accompanying drawings, which illustrate an assembled chain of links illustrating the preferred embodiment of the invention, it will be seen that the several links are identical, preferably each consisting of an integrally formed metal stamping, though it will be recognized that chain links in accordance with the invention may be formed in other manners.

Each of the links comprises a flat body generally designated 10 formed with an elongated opening 12 therein which is adapted to receive one of the teeth of a sprocket in conventional manner. The body 10 includes transversely spaced sides 14 and ends 16 and 18 respectively interconnecting the opposed sides. One of the ends 16 constitutes a pintle having its inner and outer edges 16a and 16b respectively curved concentrically about a pivotal axis located within the opening 12, preferably on the longitudinal center thereof. The other end 18 includes a preferably integral pivot element or pivot 20 which preferably constitutes a tab turned upwardly from the edge of the link at the longitudinal extremity thereof, and which projects normally from the plane of the body 10 through the opening 12 in the body of an adjoining link, which will be seen to be identical in all respects with the first-mentioned link. A transversely convex bearing surface 22 is formed on the pivot 20 of each link preferably by curving the entire thickness of said pivot, as shown in the drawings, in such a manner that the convex bearing surface 22 has a radius of curvature substantially equal to that of the inner edge 16a of the adjoining link.

This convex bearing surface 22 of the pivot 20 of each link is normally in journaled relation with the curved inner edge 16a of the pintle 16 of the immediately adjoining link. It will be seen that the width or transverse dimension of each of the pivots 20 is in any event no greater than the width of the opening 12 in each link body so as to be readily receivable in such opening. Where the chain is to be used as a conveyor for moving granular material through a trough, its efficiency may be increased by providing the ends 18 of the respective links with lateral extensions or sweeps 17.

Each of the pintles 16 normally rests flush against the flat surface of the interconnected end 18 of an adjoining link and is freely rotatable on such flat surface.

In order to prevent inadvertent uncoupling of adjoining links by relative movement of such links normally to the planes of their bodies 10, pivot 20 of each link is provided with retainer lugs 24 projecting in opposite lateral directions therefrom and overlying the sides 14 of the adjoining link in the normally longitudinally aligned relation of the links. It will be seen that the lateral extremities of the lugs 24 are spaced apart a distance in excess of the width of the opening 12 through each link body so that in order to uncouple the links it is necessary to move same relatively angularly in a lateral direction to cause the lugs 24 of one link to extend longitudinally of the opening 12 in its adjoining link, which opening being of greater length than the space between the extremities of the lugs 24, will permit such uncoupling, in the absence of the additional features hereinafter described. Needless to say, the lugs 24 of each link are spaced from the plane of their respective links a distance somewhat in excess of the thickness of the respective link bodies in order to permit a properly articulated connection between the adjoining links.

While the features above-mentioned will permit production of a chain of links which will remain assembled so long as it is maintained taut and thus will be operative for some purposes, it is, of course, desirable to provide means for preventing inadvertent uncoupling of the links where the chain is used in such a manner that it may become slack at times, with resulting tendency toward longitudinal movement between the links, or where it may be bent in the plane of the links. For this purpose there may be provided an upstanding backstop 26, preferably constituting an integral extension of the end 18 of the link, bent normally upwardly relative to the plane of the link and positioned for abutting engagement with the curved outer edge 16b of the pintle of the relatively adjoining link to maintain said pintle 16 in substantially concentric journaled relation about pivot 20. It will be seen that in addition to the function of discouraging inadvertent uncoupling of the links, the backstops 26 of the several links, by maintaining the concentric journaled relation between the pintles 16 and the pivots 20 of adjoining links, will serve the further advantageous function of preventing kinking of the links when they are drawn taut after having become slack and, in addition, will maintain an efficient easy functioning and durable pivotal connection between adjoining links.

It will generally be found further desirable, though not essential, to provide a suitable movement limiting element or stop carried by either of the elements 20 or 26, as exemplified by the limit plate 28 carried at the upper end of each backstop, in overlying relation to the pintle 16 of the adjoining link, for limiting angular movement between adjoining links in a direction normal to the planes of their bodies 10. As thus arranged, it will be seen that the elements 28 of the respective links will prevent the links from tilting relative to each other to such an extent that the edges 16b of the pintles might be moved longitudinally over top of the backstops 26, with resulting uncoupling of the links. It will be noted in the preferred embodiment that the limit plate 28 of each link projects toward, but preferably is spaced longitudinally from, the pivot 20 of its respective link to define a transverse gap for permitting edgewise manual insertion or withdrawal of an adjoining link in the operation of manually assembling or uncoupling the links in the manner hereinafter described.

For still further reducing the likelihood of accidental uncoupling of the links, each link may be provided with a pair of relatively laterally opposed abutments 30 on its pivot end 18. Each such abutment 30 may conveniently comprise an integral tongue struck up from the flat metal body of the link at such end 18, the operative portion of the abutment in such case constituting the free end of the tongue, which it will be noted is presented in a generally longitudinal direction away from the opening 12 of its respective link and toward the relatively adjacent adjoining link. These abutments 30 are thus positioned for abutting or limiting engagement with the sides 14 of the said adjacent link for preventing pivotal movement of such adjacent link from beneath the retainer lugs 24 carried by the pivot 20, as long as the bodies 10 of the respective links are in substantially parallel planes. Obviously, the abutments 30 may be employed to perform the aforementioned function, even though the backstop 26 and its associated limit plate 28 are omitted from the link construction. However, it is preferable to use such abutments 30 in combination with the backstop 26 and its limit plate 28 inasmuch as the use of these several features in combination renders the pivotal interconnections between adjoining links practically incapable of accidental uncoupling, even though permitting easy manual uncoupling and reassembling when desired.

Where these several features are thus employed in combination, the spacing of the limit plate 28 from the plane of its respective link will, of course, be such as to permit sufficient tilting between the relatively adjacent links during their pivotal movement as to permit the side edge of one such link to ride over one of the abutments 30 of another such link. Moreover, in their combined usage with the backstop 26, the abutments 30 must be spaced from their relatively adjacent retainer lugs 24 sufficiently to permit withdrawal of the associated pintle 16 of an adjoining link from beneath either of said lugs 24.

In the operation of the invention above described, in order to uncouple adjoining links, such links are grasped in the hands of the workman and simultaneously tilted to the full extent permitted by the limit plate 28 of one such link and relatively pivoted laterally about the axis of the pivot 20 of said link so that the edge of the adjoining link may move above one of such abutments 30, at the same time permitting one of the sides 14 of said adjoining link to swing from beneath the retainer lug 24, which cooperates therewith. At this time the two links will be disposed substantially at right angles to each other and will still be in relatively tilted relation, as shown in Figures 6 and 9 of the drawings.

At this point the remaining lug 24 will still overlie the pintle 16 of the adjoining link, which such link may be moved transversely then from beneath such lug to the full extent permitted by the adjoining abutment 30, then swung upwardly about the transverse axis defined by the line of contact between one of its sides 14 and the limit plate 28 until it rises above and clear of the last-mentioned lug 30, as shown in broken lines in Figure 6. Thereafter, continued upward swinging of the link to a substantially edgewise position in the gap 32 as in Figures 7 and 8 will permit withdrawal of the link in obvious manner to complete the uncoupling operation.

Obviously, such links may be readily coupled together merely by reversal of the several steps above described.

It will be readily apparent, therefore, that although the links are readily capable of manual uncoupling by the successive manipulations heretofore described, it will be virtually impossible for them to become inadvertently uncoupled through twisting, flexing or kinking of the chain of links incident to their handling or operation.

Moreover, it will be apparent that the coaction of the lugs 24 of one link with an adjoining link may serve effectively to prevent relative twisting of the links, and the cooperation of the backstop 28 of each link with the pintle 16 of an adjoining link maintains the pintle 16 at all times in efficiently journaled relation relative to the pintle 20 to provide an efficient smoothly operating and long-wearing pivotal connection which is such as to prevent relative kinking between the adjoining links and thus of the chain in its entirety.

In this application there is shown and described merely the preferred embodiment of the invention simply by way of exemplification of the preferred mode contemplated for carrying the invention into practice. However, it is recognized that the invention is capable of other embodiments and that its several elements are susceptible of modification. Accordingly, the foregoing description and drawings are to be construed as merely illustrative in nature and by no means as restrictive.

Having thus described the invention, we claim:

1. A chain of rigid links, each comprising a flat body formed with an elongated opening therein, said body including relatively spaced sides and ends defining said opening, one of said ends constituting a pintle having its inner and outer edges curved concentrically about a pivotal axis located within said opening, the other said end including an integral pivot projecting outwardly from the plane of said body through the opening in an adjoining link and having a transversely convex bearing surface normally in concentric journaled relation to the curved inner edge of the pintle of said adjoining link, said pivot including retainer lugs projecting therefrom in opposite lateral directions and overlying the sides of said adjoining link in the normally aligned relation of the links to prevent disconnection of the links while in aligned relation, in combination with a pair of relatively laterally opposed abutments on said pivot end of each link presented toward the adjoining link for engagement with the sides of said link to prevent pivotal movement of said sides from beneath the retainer lugs of said pivot, while the links are in generally parallel planes.

2. The combination of the claim 1 wherein each said abutment comprises an integral tongue struck up from the body of its respective link, the free end of each said tongue being presented toward said adjoining link.

3. The combination of claim 2 wherein said tongues are slightly resilient and the free ends thereof are vertically inclined for camming engagement with the sides of said adjoining link, when the said adjoining link is tilted.

4. The combination of claim 1 including an upstanding backstop on each said link spaced longitudinally from the convex surface of said pivot and positioned for abutting engagement with the outer edge of the pintle of said adjoining link to maintain said pintle in substantially concentric relation about said pivot.

5. The combination of claim 4, including a movement limiting element carried by said backstop in overlying relation to the pintle of said adjoining link for limiting angular movement between the links in directions generally normal to the planes of their bodies, said limiting element projecting toward but spaced longitudinally from said pivot to define a transverse gap for permitting edgewise insertion or withdrawal of said adjoining link.

6. The combination of claim 5 wherein said limit plate is spaced sufficiently from the plane of its respective link to permit a degree of tilting between relatively adjoining links such as will permit the edge of one said link to ride over said abutments of the other link, said abutments of each link being spaced from the retainer lugs of its adjoining link sufficiently to permit withdrawal of the pintle of the adjoining link from beneath either said lug.

7. A chain link comprising a flat body formed with an elongated opening therein, said body including relatively spaced sides and ends respectively, one of said ends constituting a flat pintle having its inner and outer edges curved concentrically about a pivotal axis located within said opening, the other said end including an integral pivot element projecting normally from the plane of said body and having a transversely convex bearing surface curved about a radius substantially equal to the radius of curvature of said inner edge of the pintle, said pivot element being of a transverse width no greater than said opening, and including retainer lugs projecting laterally therefrom, the transverse extremities of said lugs being spaced apart a distance greater than the width of said opening, a backstop element projecting normally from the other said end and longitudinally spaced from said pivot element a distance slightly in excess of the radial dimension of said pintle, and relatively laterally spaced abutments on said pivot end of the link body presented toward the pivot element and projecting from the plane of said body in the same direction as said pivot element.

References Cited in the file of this patent
UNITED STATES PATENTS 2,672,059    Graetz et al. ------------ Mar. 16, 1954